United States Patent
Kruczek

Patent Number: 5,839,737
Date of Patent: Nov. 24, 1998

[54] SELF PROPELLED SKATEBOARD

[76] Inventor: Leszek Kruczek, 48 Driggs Ave., #2L, Brooklyn, N.Y. 11222

[21] Appl. No.: 780,275

[22] Filed: Jan. 9, 1997

[51] Int. Cl.$^6$ ............................................. B62M 1/04
[52] U.S. Cl. ................. 280/11.115; 280/221; 280/258; 280/87.047; 280/87.041
[58] Field of Search ................ 280/11.115, 87.041, 280/87.042, 221, 258; 180/181

[56] References Cited

U.S. PATENT DOCUMENTS

| | | | |
|---|---|---|---|
| 3,567,242 | 3/1971 | Miller | 280/87.041 |
| 4,073,356 | 2/1978 | Schlight | 180/181 |
| 4,807,896 | 2/1989 | Philippi | 280/243 |
| 4,861,054 | 8/1989 | Spital | 280/221 |
| 4,887,824 | 12/1989 | Zatlin | 280/87.042 |
| 4,915,403 | 4/1990 | Wild | 280/221 |
| 5,192,089 | 3/1993 | Taylor | 280/221 |
| 5,201,659 | 4/1993 | Nelson | 280/87.042 |
| 5,224,719 | 7/1993 | Goodspeed | 280/221 |
| 5,280,935 | 1/1994 | Sobocan | 280/221 |
| 5,310,202 | 5/1994 | Goodspeed | 280/221 |
| 5,347,681 | 9/1994 | Wattron et al. | 280/87.042 |

Primary Examiner—Richard M. Campy

[57] ABSTRACT

The present invention relates to a self propeller skateboard (10) comprising upper deck (12A) pivotally mounted on a drive shaft (22) having a left drive wheel (18L) securely fastened at a left distal end and a right drive wheel (18R) securely fastened at a right distal end. The drive shaft (22) is mounted in a transmission (14) which is self propelled by a user by shifting his weight from an upper deck front (12AA) to an upper deck back (12AB) and vice-versa. When the upper deck front (12AA) is raised, a front cable (26F) is unwinded from the drive shaft (22) by rotation thereof. The drive shaft (22) is further rotated when the upper deck rear (12AB) is raised, a rear cable (26R) is unwinded from the drive shaft (22).

20 Claims, 4 Drawing Sheets

SELF PROPELLED SKATEBOARD

BACKGROUND OF THE INVENTION

1. Field of the Invention

The present invention relates to a self-propelled motorized skateboard. More particularly, the present invention relates to a self-propelled motorized skateboard with a see-saw configuration which translates power into the motor resulting in forward momentum.

2. Description of the Prior Art

Skateboarding has been a popular sport for many years. Until the present invention, all skateboarding was done by placing one foot and the person's weight on a skateboard and propelling it forward with the other foot.

Numerous innovations for skateboards have been provided in the prior art that are described as follows. Even though these innovations may be suitable for the specific individual purposes to which they address, they differ from the present invention as hereinafter contrasted.

In U.S. Pat. No. 5,280,935, titled, SELF-PROPELLED SKATEBOARD, by inventor, Boris Soboean describes a footboard of a skateboard which moves in an upward and downward direction mechanically propelling the board in a forward direction. The patented invention differs from the present invention because it's mechanical complexity and lacks a braking system.

In U.S. Pat. No. 4,915,403, titled, SKATEBOARD WITH MECHANICAL DRIVE, by inventor, Wild, describes a skateboard has a frame with a petal is pivotally mounted thereon which propels it in a forward direction. The patented invention differs from the present invention because it is propelled using one leg rather than the two legged propulsion of the present invention.

In U.S. Pat. No. 4,861,054, titled, PEDAL-POWERED SKATEBOARD, by inventor, Spital describes an improved skateboard propulsion system using a lever action dual leg propulsion system. The patented invention differs from the present invention because the upper deck is not one-piece and steering is accomplished by steerable wheels. In addition, the braking system of the patented invention is much more complex than the present invention.

In U.S. Pat. No. 4,807,896, titled, OPERATOR POWERED SKATEBOARD, by inventor Phillippi an operator powered skateboard is described. The patented invention differs from the present invention because it utilizes hand power to propel the skateboard rather than dual leg motion.

Numerous innovations for a self powered skateboard have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a self-propelled skateboard. More particularly, the present invention relates to a self-propelled motorized skateboard with a see-saw configuration which translates power into the motor resulting in forward momentum.

GENERAL SPECIFICATIONS

The person driving the vehicle stands on the upper deck. The transfer of weight from one foot to the other causes either end, the upper deck front and the upper deck back of the upper deck to move up and down in alternation. This motion is transferred by a motor to the drive wheels causing them to turn. The self propeller skateboard has two drive wheels and four castor wheels. Braking is done by pressing on the upper deck middle thereby depressing a brake with a user's foot. The self propeller skateboard can travel in a straight line, turn right and left and can also do various figures and maneuvers (spins, loops), etc. The design is simple and made of readily available materials. The self propeller skateboard is a new play vehicle for both children and youngsters.

VEHICLE CONSTRUCTION

The vehicle is made up of an upper deck and a lower deck. Both decks are mounted on a drive shaft. The upper deck is designed so that when the upper deck front is in the lower position, its upper deck back is in the upper position. The upper deck front and upper deck back of the upper deck is designed so that when its upper deck back is in the lower position, its upper deck front is in the upper position. The upper deck front and upper deck back of the upper deck move up and down in alternation in response to a shift in body weight. The lower deck comprises a lower deck front and a lower deck back joined by a lower deck middle. The special construction of the lower deck middle has a pair of mounting brackets which each of which are coupled to each other by a mounting bracket bushing, allowing for all the self propelled skateboard's castor wheels and drive wheels to contact the road simultaneously regardless of what kind of surface. The self propelled skateboard has two drive wheels attached to the drive shaft and four castor wheels. A brake is mounted between the upper deck front and upper deck rear beneath the upper deck middle of the upper panel.

VEHICLE DRIVE

The user stands on upper deck with one foot on the upper deck front and the other foot on the upper deck rear of the upper deck. The transfer of weight from one foot to the other causes the upper deck front and upper deck rear part of upper deck to move up and down in alternation propelling the self propelled skateboard in a forward direction.

A front cable and a rear cable are attached to the upper deck front and the upper deck front, respectively. If a user's foot presses the upper deck rear, then the upper deck front raises up and the front cable which in turn unwinds from right spool. The right spool rotates around the drive shaft. The right spool's revolution is transferred by a ratchet to the drive shaft. The drive shaft turns together with a right pool ratchet plate which turns the drive wheels through the ratchet mechanism. Simultaneously, the front cable is wound onto the right spool.

While the front cable is winding, right spool is driven by a spiral right spool band spring. The right spool and the left spool are constructed the same way and perform the same function in alternation. When the upper deck front of upper deck lowers, then the upper deck rear of the upper deck goes up, pulling rear cable, which winds from the left spool, and drives the drive shaft in the same direction as in the previous cycle.

BRAKING

Braking takes place through rubber a left brake and a right brake mounted on an upper deck strip. The brake shoes are held just over the left and right drive wheels by a soft rubber upper deck pad that fills up the space between the upper deck strip and the upper deck. The upper surface of upper deck strip and the upper deck are covered with a thin layer of rubber. Braking consists of pressing with a foot on the upper deck middle thereby the upper deck strip. Taking the foot off the upper deck middle causes the brake shoes to raise from the drive wheels. Braking time depends on how hard a user presses his foot. Moving foot pressure from the upper deck middle of the upper deck strip to the right or left causes a proportional increase or decrease in the brake's pressure on the individual wheels.

DRIVING

The self propelled skateboard is turned right or left by changing the revolution speed of the right or left drive wheel with the left or right brake. The quick full stop of one of the drive wheels causes the self propelled motorized skateboard to spin. Another way to change self propelled skateboard direction is for a user to twist his body right or left. Combining this twisting motion with braking allows the users to do complicated turns and maneuvers.

The types of problems encountered in the prior art are skateboards are well known in the art require self propulsion from only one leg thereby bilateral leg development and exercise does not occur.

In the prior art, unsuccessful attempts to solve this problem were attempted namely: skateboards and scooters. However, the problem was solved by the present invention because of the bidirectional leverage see-saw action of the present invention.

Innovations within the prior art are rapidly being exploited in the field of self propelled devices which give an aerobic workout.

The present invention went contrary to the teaching of the art of standard one legged self propelled skateboards and scooters.

The present invention solved a long felt need of a bilateral leg propelled device.

The present invention produced unexpected results namely: bilateral leg and aerobic exercise.

A synergistic effect was produced utilizing the present invention due to the following facts and results from experimentation: that weight shift actually reduced waist line size.

Accordingly, it is an object of the present invention to provide a self propelled motorized skateboard.

More particularly, it is an object of the present invention to provide a self propelled motorized skateboard having an upper deck and a lower deck.

In keeping with these objects, and with others which will become apparent hereinafter, one feature of the present invention resides, briefly stated, in an upper deck comprising an upper deck front, upper deck back, an upper deck middle, an upper deck top layer, an upper deck strip, and an upper deck pad.

When the upper deck middle is designed in accordance with the present invention, it has an upper deck middle support having an upper deck middle support opening therein.

In accordance with another feature of the present invention, the lower deck has a lower deck front, a lower deck back, and a lower deck middle.

Another feature of the present invention is that the lower deck middle comprises a lower deck front slit and a lower deck front opening.

Yet another feature of the present invention is that the lower deck back comprises a lower deck back slit and a lower deck back opening therein.

Still another feature of the present invention is that the lower deck middle has a lower deck middle opening therein.

Yet still another feature of the present invention is that the self propelled motorized skateboard has a motor.

Still yet another feature of the present invention is that the motor comprises a left spool and a right spool.

Another feature of the present invention is that the left spool comprises a left spool band spring, a left spool opening, a left spool ratchet pin having a left spool ratchet pivotally attached thereto, and a left spool ratchet plate.

Yet another feature of the present invention is that the right spool comprises a right spool band spring, a right spool opening, a right spool ratchet pin having a right spool ratchet pivotally attached thereto, and a right spool ratchet plate.

Still another feature of the present invention is that a front cable and a rear cable are attached to the drive shaft at one distal end and attached at an opposite distal end to the upper deck front and the upper deck back, respectively. The front cable is guided on a front cable pulley and the rear cable is on a guided rear cable pulley.

Yet still another feature of the present invention is that a spool housing comprises a spool left housing and a spool right housing.

Still yet another feature of the present invention is that a left mounting bracket has a left mounting bracket bushing and a right mounting bracket has a right mounting bracket bushing. The drive shaft is rotatably mounted in the left mounting bracket bushing and the right mounting bracket bushing.

Another feature of the present invention is that the drive shaft has a drive shaft key.

Yet another feature of the present invention is that the brake comprises a left brake and a right brake.

Still another feature of the present invention is that the castor wheel comprises a left-front castor wheel, a left-rear castor wheel, a right-front castor wheel, and a right-rear castor wheel.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING 10-self propeller motorized skateboard (10)
12-deck (12)
12A-upper deck (12A)
12AA-upper deck front (12AA)
12AAA-upper deck front slit (12AAA) (not shown)
12AB-upper deck back (12AB)
12AC-upper deck middle (12AC)
12ACA-upper deck middle support (12ACA)
12ACAA-upper deck middle support opening (12ACAA)
12AD-upper deck top layer (12AD)
12AE-upper deck strip (12AE)
12AF-upperdeck pad (12AF)
12B-lower deck (12B)
12BA-lower deck front (12BA)
12BAA-lower deck front slit (12BAA)
12BAB-lower deck front opening (12BAB)
12BB-lower deck back (12BB)
12BBA-lower deck back slit (12BBA)
12BBB-lower deck back opening (12BBB)
12BC-lower deck middle (12BC)
12BCA-lower deck middle opening (12BCA)
14-transmission (14)
16-castor wheel (16)
16LF-left-front castor wheel (16LF)
16LR-left-rear castor wheel (16LR)
16RF-right-front castor wheel (16RF)
16RR-right-rear castor wheel (16RR)
18-drive wheel (18)
18L-left drive wheel (18L)
18LA-left drive wheel knob (18LA)

-continued

BRIEF LIST OF REFERENCE NUMERALS
UTILIZED IN THE DRAWING 18R-right drive wheel (18R)
18RA-right drive wheel knob (18RA)
20-brake (20)
20L-left brake (20L)
20R-right brake (20R)
22-drive shaft (22)
22A-drive shaft key (22A)
24-spool (24)
24L-left spool (24L)
24LA-left spool band spring (24LA)
24LB-left spool opening (24LB)
24LC-left spool ratchet pin (24LC)
24LD-left spool ratchet plate (24LD)
24R-right spool (24R)
24RA-right spool band spring (24RA)
26-cable (26)
26F-front cable (26F)
26R-rear cable (26R)
28-spool housing (28)
28L-spool left housing (28L)
28R-spool right housing (28R)
30-ratchet (30)
30L-left ratchet (30L)
30R-right ratchet (30R)
32-mounting bracket (32)
32L-left mounting bracket (32L) (not shown)
32LA-left mounting bracket bushing (32LA) (not shown)
32R-right mounting bracket (32R)
32RA-right mounting bracket bushing (32RA)
34-cable pulley (34)
34F-front cable pulley (34F)
34R-rear cable pulley (34R)

DESCRIPTION OF THE PREFERRED EMBODIMENT

Figure 1:
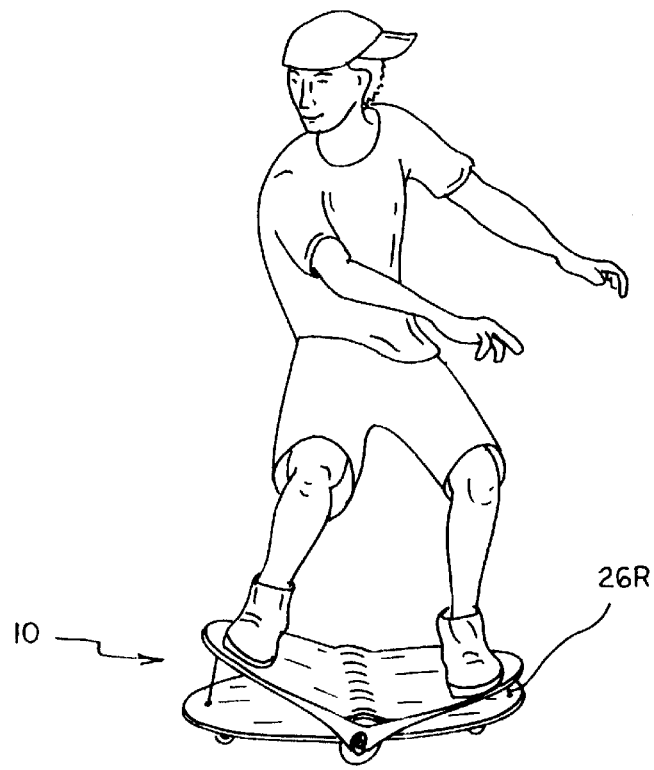
FIG. 1 is a top perspective view of a user riding a self propelled motorized skateboard.

Firstly, referring to FIG. 1 which is a top perspective view of a user riding a self propelled skateboard (10). The user transfers his weight from his front foot to his back foot which in turn pushes the upper deck back (12AB) in a downward direction and concurrently raises the upper deck front (12AA). Vice-versa, the user the transfers his weight from his back foot to his front foot which in turn pushes the upper deck front (12AA) in a downward direction and concurrently raises the upper deck back (12AB).

Figure 2:
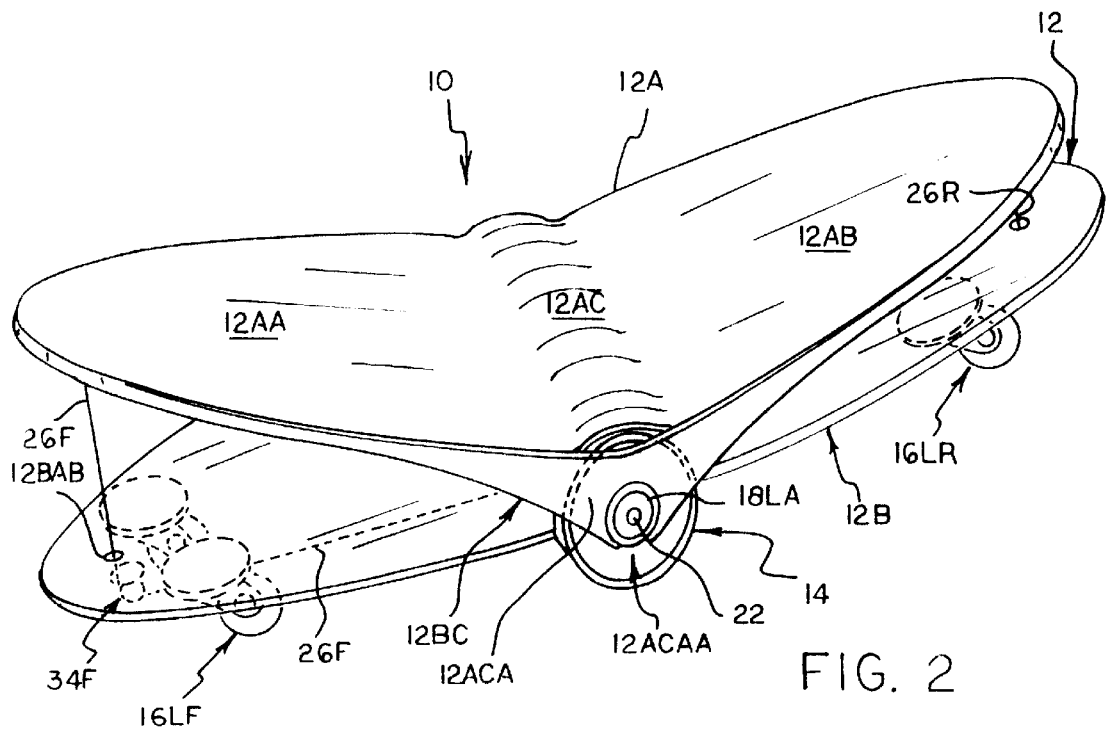
FIG. 2 is a top perspective view of a self propelled skateboard.

Referring to FIG. 2 which is a top perspective view of a self propelled skateboard (10). The deck (12) comprises an upper deck (12A) and a lower deck (12B). The upper deck (12A) comprises an upper deck front (12AA), an upper deck back (12AB), and an upper deck middle (12AC). The upper deck front (12AA) and the upper deck back (12AB) are angled in an upward direction from the upper deck middle (12AC). The upper deck middle (12AC) comprises an upper deck middle support (12ACA) having an upper deck middle support opening (12ACAA) through which a drive shaft (22) is passed and rotates thereon. The lower deck (12B) comprises a lower deck front (12BA), a lower deck back (12BB) which are separated from each other by a lower deck middle (12BC). The lower deck front (12BA) has a lower deck front opening (12BAB) through which a front cable (26F) is passed guided by a front cable pulley (34F) and connected at a distal end to the upper deck front (12AA). The lower deck back (12BB) has a lower deck back opening (12BBB) through which a rear cable (26R) is passed guided by a rear cable pulley (34R) and connected at a distal end to the upper deck rear (12AB).

When a user shifts his weight from his front foot to his rear foot, the upper deck back (12AB) lowers with the rear cable (26R) retractably winding therein and concurrently the upper deck front (12AA) raises with the front cable (26F) unwinding. Vice-versa, when a user shifts his weight from his rear foot to his front foot, the upper deck back (12AB) raises with the rear cable (26R) unwinding and concurrently the upper deck front (12AA) lowers with the front cable (26F) retractably winding therein.

Attached on an underside of the lower deck front (12BA) are at least one castor wheel (16). Preferably, a pair of castor wheels (16) which are a left-front castor wheel (16LF) and a left-rear castor wheel (16LR) are attached thereunder. At least one castor wheel (16) is attached under the lower deck back (12BB). Preferably, a pair of castor wheels (16) which are a right-front castor wheel (16RF) and a right-rear castor wheel (16RR) are attached thereunder.

Rotatably attached at opposite distal ends of the drive shaft (22) are a left drive wheel (18L) having a left drive wheel knob (18LA) and a right drive wheel (18R) having a right drive wheel knob (18RA). The left and right drive wheel knobs (18LA, 18RA) function as a drive shaft (22) fasteners to rotatably attach the left drive wheel (18L) and the right drive wheel (18R), respectively, to the drive shaft (22). The left and right drive wheel knobs (18LA, 18RA) also function as a tensioning device to increase and decrease frictional resistance of the left drive wheel (18L) and the right drive wheel (18R) rotatably on the drive shaft (22). Preferably, the left and right drive wheel knobs (18LA, 18RA) have a female threaded member (not shown) therein which is complimentary to male threaded members (not shown) on each distal end of the drive shaft (22). Therefore, to increase resistance, the left and right drive wheel knobs (18LA, 18RA) are rotated in a clockwise direction on the drive shaft (22) thereby tightening thereon. Conversely, to decrease resistance, the left and right drive wheel knobs (18LA, 18RA) are rotated in a counter-clockwise direction on the drive shaft (22) thereby loosening therefrom.

Figure 2A:
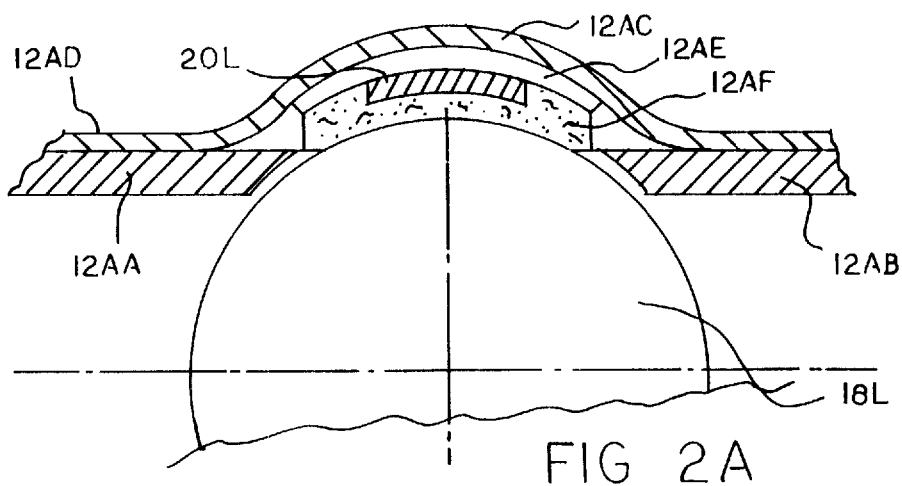
FIG. 2A is a cross sectional view along line 2A—2A of FIG. 2B of a brake between a upper deck middle and a drive wheel.
Figure 2B:
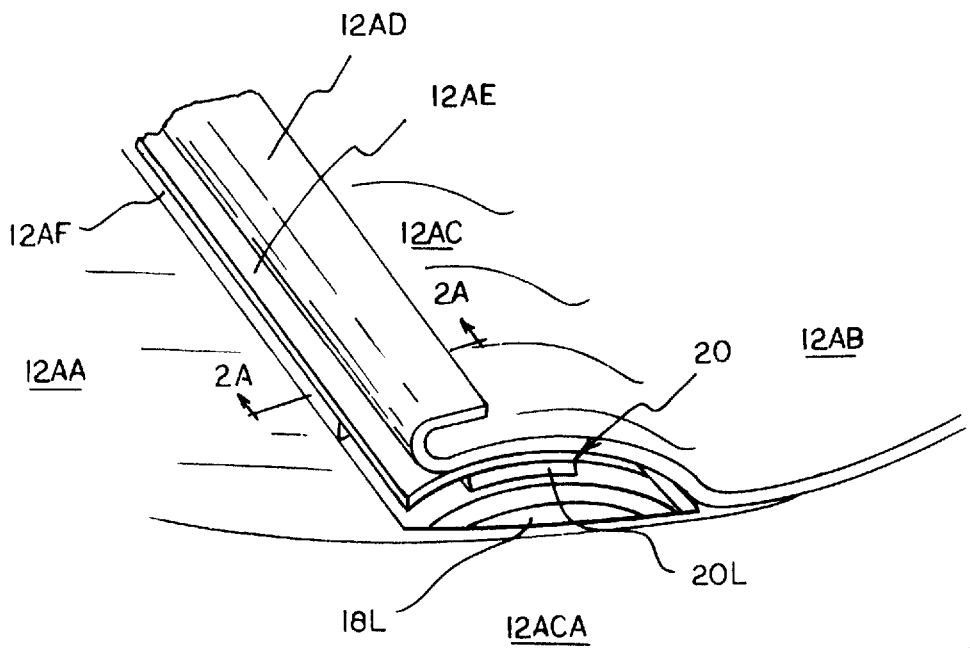
FIG. 2B is a top perspective partial cross-sectional view of a self propelled skateboard exhibiting an upper deck top layer, an upper deck strip, an upper deck pad, and a brake.
Figure 2B:
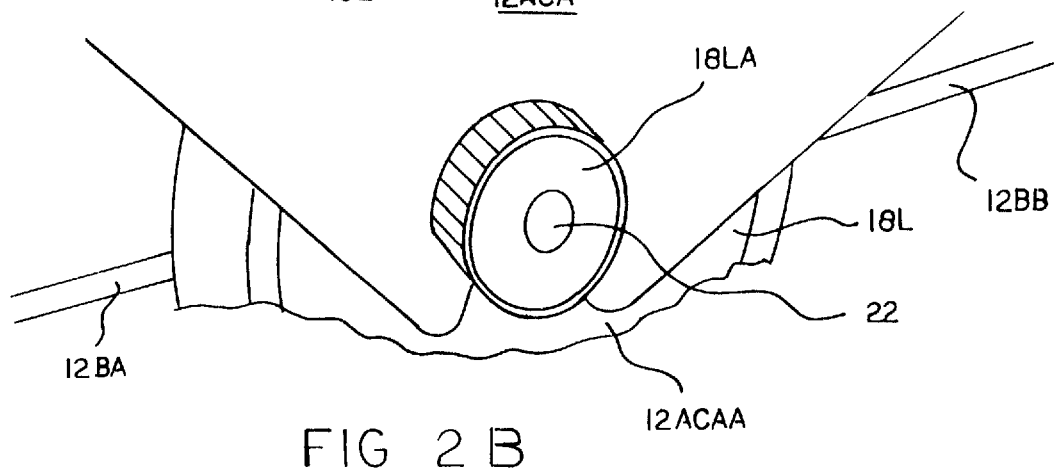

Now referring to FIG. 2A which is a cross sectional view along line 2A—2A of FIG. 2B of a brake (20) between a upper deck middle (12AC) and a drive wheel (18). When a user applies foot pressure on the top of the upper deck middle (12AC), the brake (20), which comprises a left brake (20L) and a right brake (20R), is depressed in a downward direction frictionally contacting the left drive wheel (18L) and the right drive wheel (18R). A user can maneuver the self propeller motorized skateboard (10) in a zig-zag motion and/or turn by applying unequal pressure to the left brake (20L) and a right brake (20R) which in turn allows the left drive wheel (18L) or the right drive wheel (18R) to rotate while the opposite right drive wheel (18R) or the left drive wheel (18L) is braking.

Referring to FIG. 2B which is a top perspective partial cross-sectional view of a self propelled motorized skateboard (10) exhibiting an upper deck top layer (12AD), an upper deck strip (12AE), an upper deck pad (12AF), and a brake (20). The upper deck top layer (12AD) preferably has an anti-slip top surface and is laminated onto the upper deck strip (12AE) which functions as a strengthening means for braking. The upper deck pad (12AF) is securely attached to the upper deck strip (12AE) and the brake (20). The upper deck pad (12AF) is preferably constructed from a soft compressible material which allows a wider range of pressure that can be applied during braking.

Figure 3:
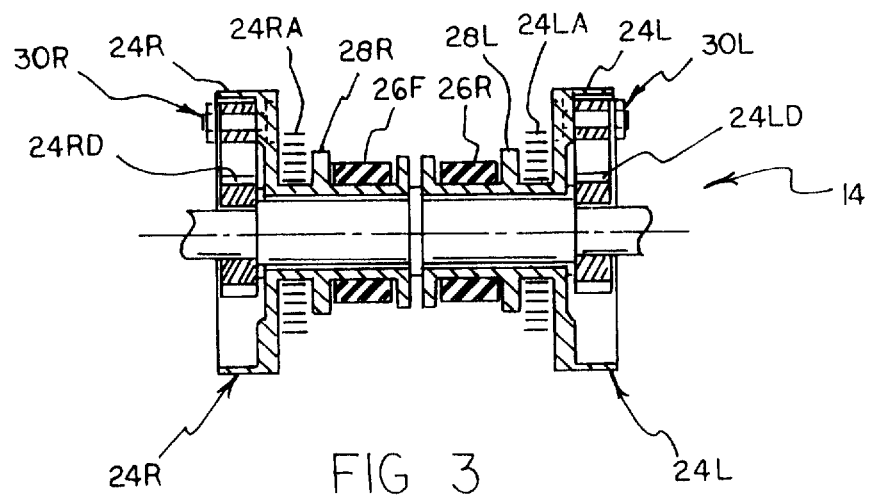
FIG. 3 is a cross sectional view of a motor along line 3—3 of FIG. 4.
Figure 3A:
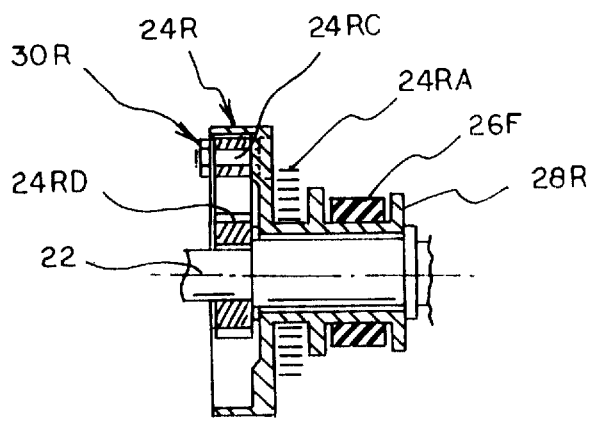
FIG. 3A is a cross sectional enlarged view of a right spool.
Figure 3B:
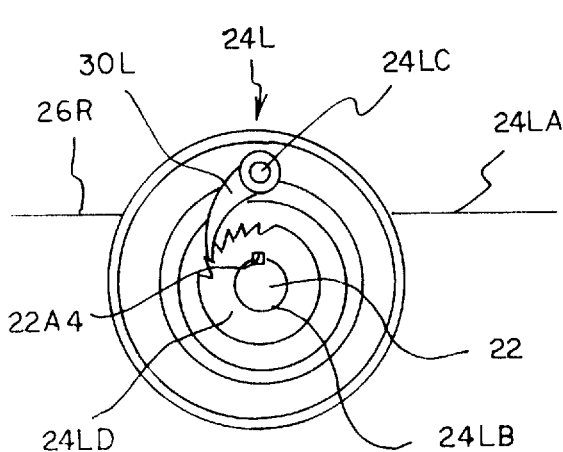
FIG. 3B is a right side view of a left spool along line 3B—3B of FIG. 3.
Figure 3C:
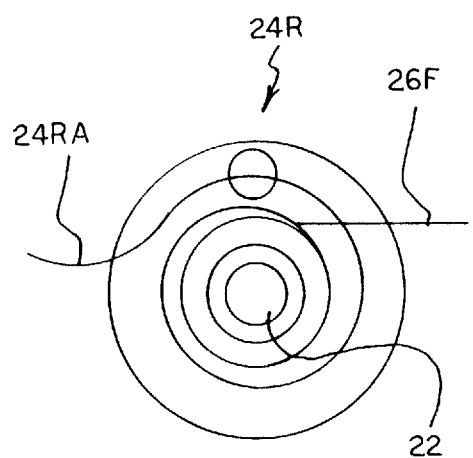
FIG. 3C is a cross sectional view of a right spool along line 3C—3C of FIG. 3.
Figure 4:
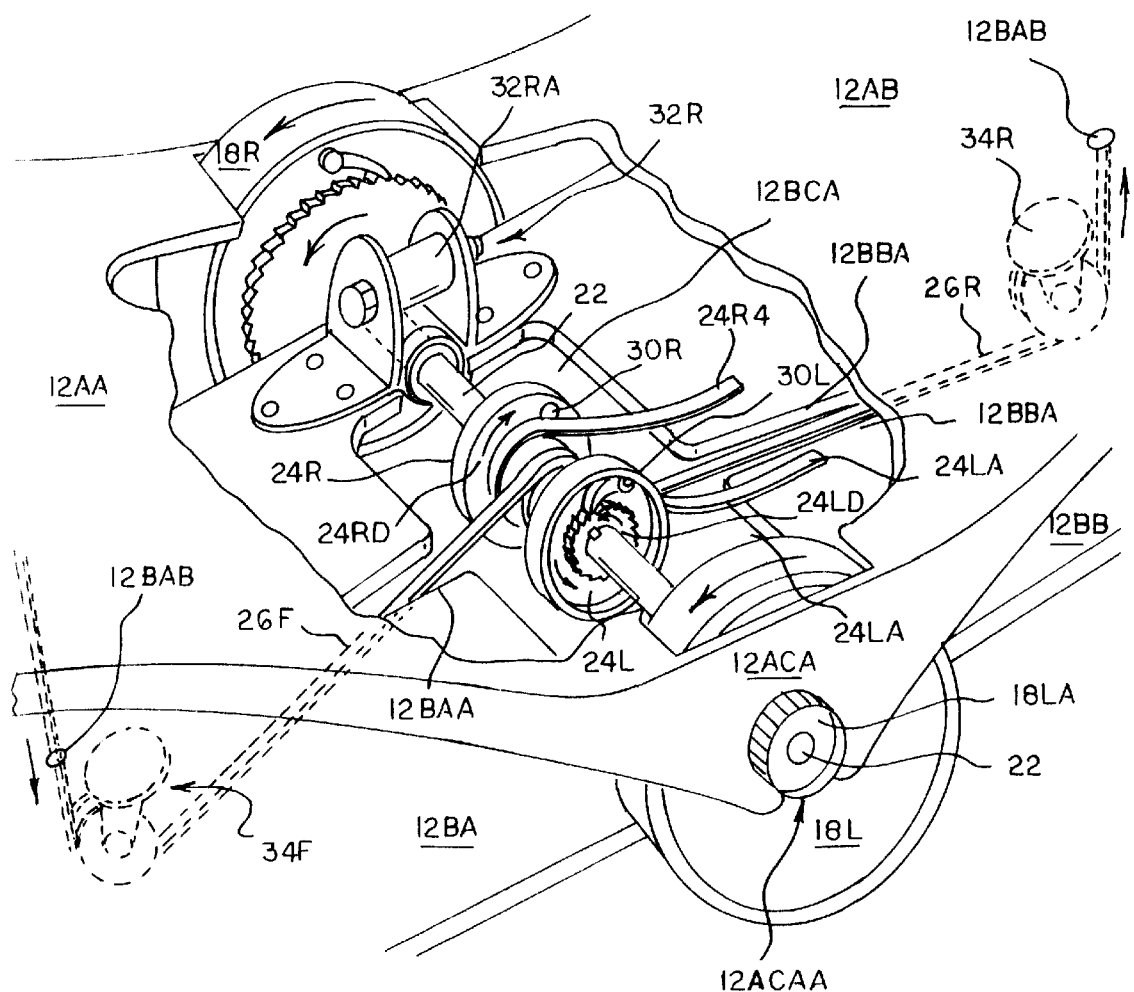
FIG. 4 is a partial sectional view of a motor contained within the self propelled skateboard.

Referring to FIG. 3 which is a cross sectional view of a motor (14) along line 3—3 of FIG. 4, FIG. 3A which is a cross sectional enlarged view of a right spool (24R), FIG. 3B which is a right side view of a left spool (24L) along line 3B—3B of FIG. 3, and FIG. 3C which is a cross sectional view of a right spool (24R) along line 3C—3C of FIG. 3. A left spool (24L) and a right spool (24R) are securely fastened to a spool left housing (28L) and a spool right housing (28R) of a spool housing (28). The left spool (24L) and the right spool (24R) comprise a left spool opening (24LB) and a right spool opening (24RB), respectively, through which the drive shaft (22) is mounted therethrough. The left spool (24L) and the right spool (24R) further comprise a left spool ratchet plate (24LD) and a right spool ratchet plate (24RD) which are securely fastened to the drive shaft (22) by a drive shaft key (22A). The left spool (24L) further comprises a left spool ratchet pin (24LC) having a left spool ratchet (24LE) rotatably mounted thereon which engages the left spool ratchet plate (24LD) to maintain forward movement of the self propeller motorized skateboard (10). The right spool (24R) further comprises a right spool ratchet pin (24RC) having a right spool ratchet (24RE) rotatably mounted thereon which engages the right spool ratchet plate (24RD) to maintain forward movement of the self propeller skateboard (10). The left spool (24L) and the right spool (24R) further comprise left spool band spring (24LA) and a right spool band spring (24RA). While the front cable (26F) is winding on the drive shaft (22), the right spool (24R) is driven by the right spool band spring (24RA). Conversely, when the rear cable (26R) is winding on the drive shaft (22), the left spool (24L) is driven by the left spool band spring (24LA). When the upper deck front (12AA) lowers, then the upper deck back (12AB) goes up, pulling the rear cable (26R), which unwinds from the left spool (24L), and drives the drive shaft (22) in a forward direction.

Referring to FIG. 4 which is a partial sectional view of a transmission (14) contained within the self propelled motorized skateboard (10). The transmission (14) is actually comprised of the left spool (24L), right spool (24R), and drive shaft (22) as described above. The drive shaft (22) is rotatably mounted in a left mounting bracket bushing (32LA) (not shown) of a left mounting bracket (32L) (not shown) and a right mounting bracket bushing (32RA) of a right mounting bracket (32R). The left mounting bracket (32L) (not shown) and the right mounting bracket (32R) are securely fastened at opposite sides to the lower deck middle (12BC). The transmission (14) is suspended within a lower deck middle opening (12BCA). A lower deck front slit (12BAA) and a lower deck back slit (12BBA) extend frontwardly and rearwardly from the lower deck middle opening (12BCA). The lower deck front slit (12BAA) and the lower deck back slit (12BBA) function to accommodate the front cable (26F) and the rear cable (26R), respectively.

The deck (12) is manufactured from a material selected from a group of materials consisting of wood, wood composite, plastic, plastic composite, epoxy, fiberglass, and carbon-graphite.The open headed arrows indicate the direction of movement It will be understood that each of the elements described above, or two or more together, may also find a useful application in other types of constructions differing from the type described above.

While the invention has been illustrated and described as embodied in a self propeller motorized skateboard, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A self propeller skateboard (10) comprising:
   A) a deck (12) which comprises:
      I) an upper deck (12A) consisting of upper deck front (12AA) and an upper deck back (12AB) separated by an upper deck middle (12AC) having an upper deck middle support (12ACA) with an upper deck middle support opening (12ACAA), the upper deck front (12AA) and the upper deck back (12AB) are angled in an upward direction from the upper deck middle (12AC), and
      ii) a lower deck (12B) consisting of a lower deck front (12BA) having a lower deck front slit (12BAA) and a lower deck front opening (12BAB) therein, a lower deck back (12BB) having a lower deck back slit (12BBA) and a lower deck back opening (12BBB) therein, and a lower deck middle (12BC) having a lower deck middle opening (12BCA) therein;
   B) a transmission (14) suspendedly mounted within the lower deck middle opening (12BCA) which comprises:
      I) a drive shaft (22),
      ii) a left spool (24L) having a left spool opening (24LB) through which the drive shaft (22) is mounted, the left spool (24L) is securely fastened to a spool left housing (28L) of a spool housing (28), the left spool (24L) is driven by a left spool band spring (24LA) attached thereto, the left spool (24L) comprises a left spool ratchet pin (24LC) having a left spool ratchet (24LE) pivotally mounted thereon, the left spool (24L) further comprises a left spool ratchet plate (24LD) securely mounted on the drive shaft (22), the left spool ratchet (24LE) engages the left spool ratchet plate (24LD) functioning to prevent backward directional travel of the self propeller motorized skateboard (10), and
      iii) a right spool (24R) having a right spool opening (24RB) through which the drive shaft (22) is mounted, the right spool (24R) is securely fastened to a spool right housing (28L) of a spool housing (28), the right spool (24R) is driven by aright spool band spring (24RA) attached thereto, the right spool (24R) comprises a right spool ratchet pin (24RC) having a right spool ratchet (24RE) pivotally mounted thereon, the right spool (24R) further comprises a right spool ratchet plate (24RD) securely mounted on the drive shaft (22), the right spool ratchet (24RE) engages the right spool ratchet plate (24RD) functioning to prevent backward directional travel of the self propeller motorized skateboard (10);

C) at least one castor wheel (16) mounted on a bottom of each of the lower deck front (12BA) and lower deck back (12BB);

D) a left drive wheel (18L) and a right drive wheel (18R) securely fastened to the drive shaft (22);

E) a front cable puny (34F) mounted on a bottom of the lower deck front (12BA) and a rear cable pully (34R) mounted on a bottom of the lower deck rear (12BB);

F) a front cable (26F) securely attached at one distal end to the drive shaft (22) and securely attached at an opposite distal end to the upper deck front (12AA), the front cable (26F) is guided within the front cable puly (34F) through the lower deck front slit (12BAA) and the lower deck front opening (12BAB) and a rear cable (26R) securely attached at one distal end to the drive shaft (22) and securely attached at an opposite distal end to the upper deck rear (12AB), the rear cable (26R) is guided within the rear cable pully (34R) through the lower deck rear slit (12BBA) and the lower deck rear opening (12BBB), the front cable pully (34F) and the rear cable pully (34R) function to rotate the drive shaft when pressure is applied on the upper deck front (12AA) and upper deck back (12AB); and G) a left mounting bracket (32L) having a left mounting bracket bushing (32LA) and a right mounting bracket (32R) having a right mounting bracket bushing (32RA) are securely fastened to opposite sides of the lower deck middle (12BC), the drive shaft (22) is rotatably mounted within the left mounting bracket bushing (32LA) and the right mounting bracket bushing (32RA).

2. The self propeller skateboard (10) as described in claim 1, wherein the upper deck (12A) is manufactured from a laminate consisting of upper deck top layer (12AD) and upper deck strip (12AE) positioned at the upper deck middle (12AC).

3. The self propeller skateboard (10) as described in claim 2, wherein the upper deck top layer (12AD) has antislip thereon.

4. The self propeller skateboard (10) as described in claim 2, wherein the upper deck strip (12AE) is securely affixed onto a upper deck pad (12AF) which is securely affixed onto a brake (20), the upper deck pad (12AF) is manufactured from a soft resiliently compressible material.

5. The self propeller skateboard (10) as described in claim 1, wherein the brake (20) comprises a left brake (20L) positioned over the left drive wheel (18L) and a right brake (20R) positioned over the right drive wheel (18R).

6. The self propeller skateboard (10) as described in claim 1, wherein the left drive wheel (18L) comprises a left drive wheel knob (18LA) tensionably attached to a left distal end of the drive shaft (22) and a right drive wheel (18R) comprises a right drive wheel knob (18RA) tensionably attached to a right distal end of the drive shaft (22), the left drive wheel knob (18LA) and the right drive wheel knob (18RA) function to increase and decrease frictional tension on the left drive wheel (18L) and right drive wheel (18R).

7. The self propeller skateboard (10) as described in claim 1, wherein the drive shaft (22) has a drive shaft key (22A) attached thereon which functions to engagably attach the left spool ratchet plate (24LD) and the right spool ratchet plate (24RD) to the drive shaft (22).

8. The self propeller skateboard (10) as described in claim 1, wherein the castor wheels (16) are a left-front castor wheel (16LF), a left-rear castor wheel (16LR), a right-front castor wheel (16RF) and a right-rear castor wheel (16RR).

9. A skateboard comprising:

a lower deck having a lower deck front, a lower deck middle, and a lower deck back;

at least one front castor wheel mounted to a bottom surface of the lower deck proximal to the lower deck front;

at least one rear castor wheel mounted to a bottom surface of the lower deck proximal to the lower deck back;

a left drive wheel mounted relative to the lower deck proximal to a left side of the lower deck middle;

a right drive wheel mounted relative to the lower deck proximal to a right side of the lower deck middle.

10. The skateboard of claim 9, and further comprising an upper deck pivotally mounted relative to the lower deck middle, the upper deck being mechanically coupled relative to at least one of the drive wheels such that a manual pivoting of the upper deck relative to the lower deck will effect rotation of at least one of the drive wheels.

11. The skateboard of claim 10, wherein the upper deck comprises an upper deck front, an upper deck middle, and an upper deck back, the upper deck front extending at an obtuse angle relative to the upper deck rear, with the upper deck middle being pivotally mounted relative to the lower deck middle, the upper deck being mechanically coupled relative to at least one of the drive wheels such that a manual pivoting of the upper deck relative to the lower deck about the upper deck middle will effect rotation of at least one of the drive wheels.

12. The skateboard of claim 11, and further comprising a drive shaft rotatably mounted to the lower deck middle, the drive wheels being rotatably mounted to the drive shaft and mechanically coupled therewith so as to spin with the drive shaft in response to a forward rotation of the drive shaft relative to the drive wheels and to spin without the drive shaft in response to a backward rotation of the drive shaft relative to the drive wheels;

a cable coupled to the upper deck, whereby pivoting of the upper deck will effect tensioning of the cable, the cable being mechanically coupled to the drive shaft such that tensioning of the cable effects a forward rotation of the drive shaft.

13. The skateboard of claim 12, wherein the cable is coupled to the upper deck front, and further comprising a rear cable coupled to the upper deck back, whereby pivoting of the upper deck will effect tensioning of the rear cable, the rear cable being mechanically coupled to the drive shaft such that tensioning of the rear cable effects a forward rotation of the drive shaft.

14. The skateboard of claim 11, wherein the upper deck front has a front edge and the upper deck rear has a rear edge, the front castor wheel being mounted to the lower deck and positioned beneath the upper deck front so as to reside between the upper deck front edge and the upper deck middle, the rear castor wheel being mounted to the lower deck and positioned beneath the upper deck rear so as to reside between the upper deck rear edge and the upper deck middle;

and further wherein there are no additional wheels mounted to the skateboard which are positioned beyond the upper deck front edge or behind the upper deck rear edge.

15. The skateboard of claim 9, wherein the drive wheels project above an upper surface of the lower deck, and further wherein the drive wheels rotate independently of one another such that manual braking of one of the drive wheels will cause the skateboard to turn.

16. The skateboard of claim 15, and further comprising:

a brake assembly supported relative to the lower deck, the brake including a left brake positioned proximal to the left drive wheel and a right brake positioned proximal to the right drive wheel, the brakes being independently manually engagable with the respective drive wheel to effect braking of the respective drive wheel.

17. The skateboard of claim 16, and further comprising an upper deck mounted relative to the lower deck, the upper deck having an upper deck middle which can be manually biased towards the lower deck, with the brakes being mounted to the upper deck middle such that a manual biasing of the upper deck middle towards the lower deck can effect independent manual engagement of either of the brakes with the respective drive wheel to effect braking of the respective drive wheel.

18. The skateboard of claim 17, wherein the upper deck middle comprises a flexible upper deck strip.

19. A skateboard comprising:

a lower deck having a lower deck front, a lower deck middle, and a lower deck back;

at least one wheel mounted to a bottom surface of * the lower deck;

at least one drive wheel mounted to a bottom surface of the lower deck;

an upper deck comprising an upper deck front, an upper deck middle, and an upper deck back, the upper deck front extending at an obtuse angle relative to the upper deck rear, with the upper deck middle being pivotally mounted relative to the lower deck middle, the upper deck being mechanically coupled relative to the drive wheel such that a manual pivoting of the upper deck relative to the lower deck about the upper deck middle will effect rotation of the drive wheel.

20. The skateboard of claim 19, wherein the upper deck front has a front edge and the upper deck rear has a rear edge, the wheels being mounted to the lower deck and positioned beneath the upper deck so as to reside between the upper deck front edge and the upper deck rear edge;

and further wherein there are no additional wheels mounted to the skateboard which are positioned beyond the upper deck front edge or behind the upper deck rear edge.

* * * * *